United States Patent [19]

de Mévergnies et al.

[11] 4,313,807

[45] Feb. 2, 1982

[54] METHOD FOR ENRICHING A GASEOUS ISOTOPIC MIXTURE WITH AT LEAST ONE ISOTOPE

[75] Inventors: Marcel N. de Mévergnies; Paul Fettweis, both of Mol, Belgium

[73] Assignee: "Studiecentrum voor Kernenergie," "S.C.K.", Schaerbeek, Belgium

[21] Appl. No.: 26,507

[22] Filed: Apr. 3, 1979

[30] Foreign Application Priority Data

Apr. 3, 1978 [BE] Belgium .................................. 186519
Feb. 6, 1979 [BE] Belgium .................................. 193306

[51] Int. Cl.³ ............................................. B01D 59/00
[52] U.S. Cl. ............................................. 204/157.1 R
[58] Field of Search ................................... 204/157.1 R

[56] References Cited

U.S. PATENT DOCUMENTS 4,025,406  5/1977  Lamotte et al. .............. 204/157.1 R
4,120,767 10/1978  Bittenson et al. ................ 204/158 R

OTHER PUBLICATIONS

Ritter, J. J. et al., J.C.S. Chem. Comm. 1976, pp. 811-813.
Jensen, R. J. et al., Laser Focus May, 1976, pp. 51, 52, 59-63.
Dever, D. F. et al., J. Am. C. S. 98(17): 5055-5062, Aug. 18, 1976.

Primary Examiner—Deborah L. Kyle
Attorney, Agent, or Firm—Sughrue, Mion, Zinn, Macpeak & Seas

[57] ABSTRACT

There is described a method for enriching a gas-like isotopic mixture with at least one isotope, in which a mixture of $CF_2Cl_2$ and $O_2$ is irradiated by means of a pulsed and focalized laser beam having an optical frequency corresponding to a wave number lying in the band from 920 to 945 cm$^{-1}$ to enrich the residual $CF_2Cl_2$ with $^{37}Cl$, in the band from 1050 to 1075 cm$^{-1}$ to produce $COF_2$ enriched with $^{13}C$ and/or in the band from 1080 to 1095 cm$^{-1}$ to enrich the residual $CF_2Cl_2$ with $^{35}Cl$ and $^{13}C$.

5 Claims, 5 Drawing Figures

METHOD FOR ENRICHING A GASEOUS ISOTOPIC MIXTURE WITH AT LEAST ONE ISOTOPE

This invention relates to a method for enriching a gaseous isotopic mixture with at least one isotope, more particularly to a method for separating isotopes wherein use is made of an IR-photon absorption to excite selectively one or a plurality of isotopes from the isotopic mixture and wherein a mixture enriched with said isotope or isotopes is separated.

The method according to the invention is applied to an isotopic mixture which is comprised of $CF_2Cl_2$, known under the name "Freon," and $O_2$.

According to J. L. Lyman, S. D. Rockwood, J. Appl. Phys. 47, 596 (1976) and M. C. Gower, K. W. Billman, Appl. Phys. Lett. 30, 514 (1977), it is known to enrich residual $CF_2Cl_2$ with $^{13}C$ by means of a beam from a $CO_2$ laser P (20) (001-100) having a wave number of 944 cm$^{-1}$.

In J. J. Ritter, S. M. Freund, JC.SC.Chem.Comm. (1976), 811 there is described the enrichment of residual $CF_2Cl_2$ with $^{13}C$ and of the $COF_2$ formed with $^{12}C$ by means of a laser beam P(36)(001-100) having a wave number of 929 cm$^{-1}$ as well as the enrichment of residual $OF_2Cl_2$ with $^{12}C$ by means of a laser beam R(18)(001-020) having a wave number of 1077 cm$^{-1}$.

Not a single one of the described methods allow a sufficient enrichment with carbon isotopes to be obtained to make possible a practical and more particularly an industrial application thereof. The above disclosures rather contain a scientific study of isotopic actions on carbon and do not mention moreover in any way an enrichment with chlorine isotopes.

The most economically-promising method up to now for obtaining $^{13}C$ appears to be one in which up to 90% $^{13}C$-enriched CO is obtained by distilling liquid CO at low temperatures (see "Stable isotopes in the Life Sciences" IAEA, Vienna 1977, pp. 14 and 15). The cost of $^{13}C$ obtained with this method appears to lie however relatively high.

Other, however not energy-efficient, methods applied to separate carbon and chlorine isotopes are as follows: diffusion through a membrane, thermodiffusion for instance according to Clusius-Dickel's method, electromagnetic mass separation.

The invention has for object to provide a method for the separation of both carbon and chlorine isotopes in an energically-, technically-, economically- and industrially- warranted way.

For this purpose according to the invention, a mixture of $CF_2Cl_2$ and $O_2$ is irradiated by means of a pulsed and focalized laser beam having an optical frequency corresponding to a wave number lying in the band from 920 to 945 cm$^{-1}$ to enrich the residual $CF_2Cl_2$ with $^{37}Cl$, in the band from 1050 to 1075 cm$^{-1}$ to produce $COF_2$ enriched with $^{13}C$ and/or in the band from 1080 to 1095 cm$^{-1}$ to enrich the residual $CF_2Cl_2$ with $^{35}Cl$ and $^{13}C$.

According to a particular embodiment of the invention, there is performed to obtain $COF_2$ enriched with $^{13}C$ from a mixture of $CF_2Cl_2$ and $O_2$, a first irradiating of this mixture in the band from 1050 to 1075 cm$^{-1}$ to perform mainly the following reaction:

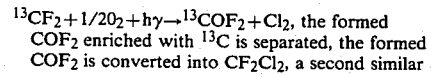

$^{13}CF_2 + 1/2 O_2 + h\gamma \rightarrow ^{13}COF_2 + Cl_2$, the formed $COF_2$ enriched with $^{13}C$ is separated, the formed $COF_2$ is converted into $CF_2Cl_2$, a second similar irradiating is performed on this $CF_2Cl_2$ thus enriched with $^{13}C$ and the $COF_2$ enriched with $^{13}C$ formed anew with a higher concentration is separated.

In another particular embodiment of the invention, to obtain $COF_2$ enriched with $^{13}C$, a mixture of $CF_2Cl_2$ and $O_2$ is subjected to a first irradiation in the band from 1080 to 1095 cm$^{-1}$ preferably between 1085 and 1090 cm$^{-1}$ by means of a laser to produce mainly the following reaction:

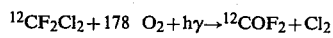

$$^{12}CF_2Cl_2 + 178\ O_2 + h\gamma \rightarrow ^{12}COF_2 + Cl_2$$

the formed $COF_2$ is separated and a second irradiating is performed on the residual $CF_2Cl_2$ already enriched with $^{13}C$ after the first irradiating, by means of a laser in the band from 1050 to 1075 cm$^{-1}$ to obtain $COF_2$ enriched with $^{13}C$ with a higher concentration, according to the following reaction:

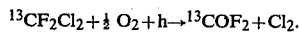

$$^{13}CF_2Cl_2 + \tfrac{1}{2} O_2 + h \rightarrow ^{13}COF_2 + Cl_2.$$

In a preferred embodiment of the invention, when the irradiation occurs at an optical frequency corresponding to a wave number lying in the band 1050–1075 cm$^{-1}$ this is made with a $CO_2$ laser the gas supply of which contains substantially no nitrogen and the partial pressure of $CF_2Cl_2$ in the mixture to be irradiated is maintained between 2 and 4 Torr.

Other details and features of the invention will stand out from the following description given by way of non limitative example, and with reference to the accompanying drawings, in which.

Figure 1:
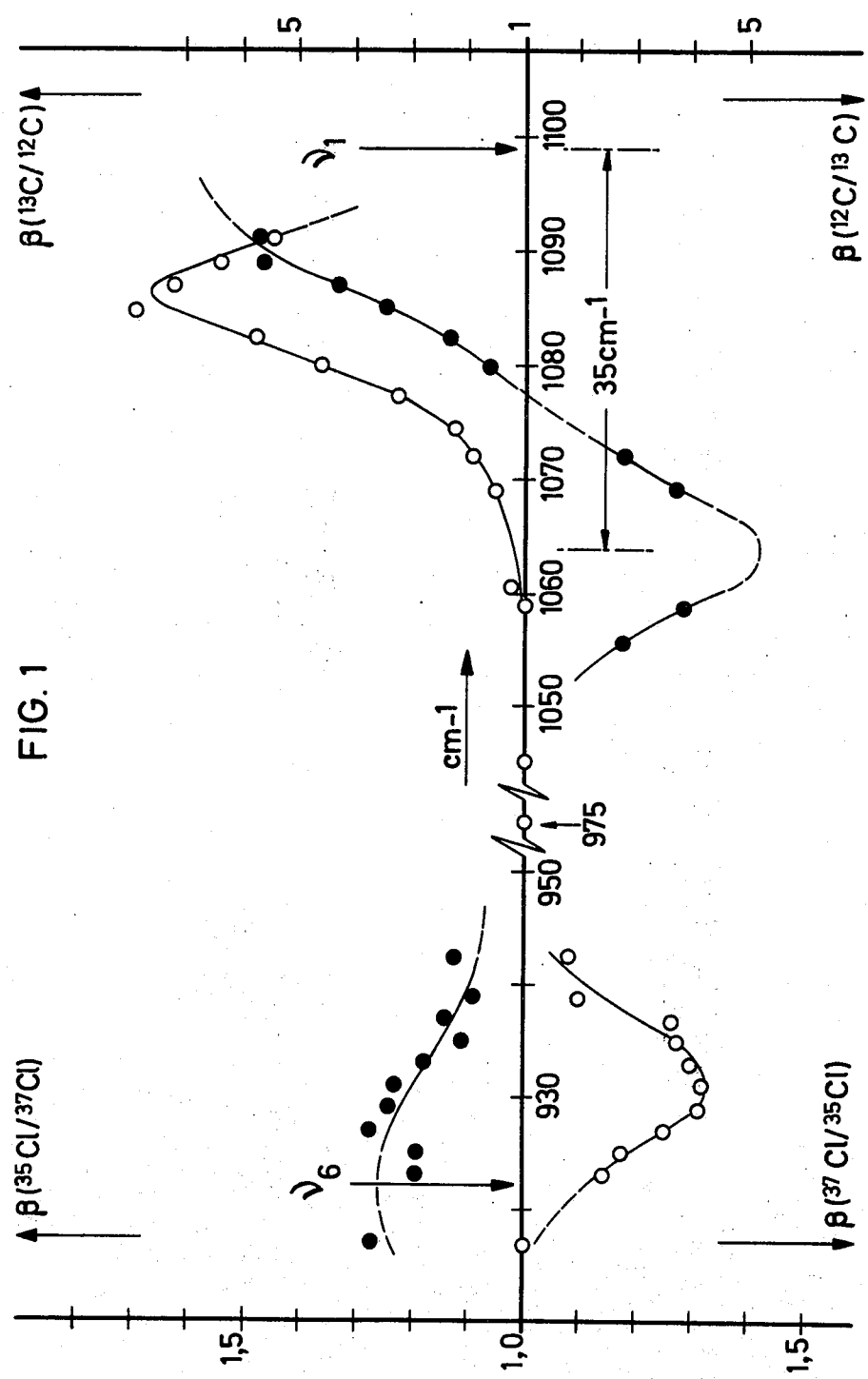
FIG. 1 is a diagram showing the enrichment factors for carbon and chlorine isotopes in the residual $CF_2Cl_2$ as a function of the wave number of a $CO_2$ laser, with which a mixture of $CF_2Cl_2$ and $O_2$ is irradiated.

Freon ($CF_2Cl_2$) has two strong absorption bands, $\gamma_1$ and $\gamma_6$, in the infrared range with a wave length that lies within the range of a $CO_2$ laser. When gaseous Freon is irradiated with a pulsed and focalized $CO_2$ laser beam, it is determined that adjacent both bands $\gamma_1$ and $\gamma_6$ shown in FIG. 1, $CF_2Cl_2$ molecules are dissociated whereby the major end products of interest are $C_2F_4$ and $Cl_2$. When the test is repeated with a mixture of $CF_2Cl_2$ and $O_2$, there is mainly obtained $COF_2$ and $Cl_2$.

For the various isotopic molecules of Freon such as $^{12}CF_2^{35}Cl_2$, $^{13}CF_2^{35}Cl_2$, $^{12}CF_2^{35}Cl^{37}Cl$, etc. the absorption peaks in the bands $\gamma_1$ and $\gamma_6$ appear to be at wave lengths which are slightly different (a phenomenon which is known as "isotopic displacement" of the optic spectrum). When the wave length of the $CO_2$ laser which irradiates for example a mixture from $CF_2Cl_2$ and $O_2$ is changed, it is indeed noticed that the one or the other isotopic variety of $CF_2Cl_2$ reacts preferably. There is thus obtained after irradiating reaction products such as $CF_2Cl_2$, $COF_2$, $Cl_2$, the isotopic composition of which has been changed relative to the original natural composition.

With a particular selection according to the invention of the irradiating range, the energy consumption relative to the efficiency attained appears to be minimized.

Measures have shown that the decomposition of a $CF_2Cl_2$ molecule requires about 200 IR photons from a TEA-$CO_2$ laser.

A laser pulse of 1 joule may thus decompose about $(5 \times 10^9)/(200 \times 6 \times 10^{23}) \approx 0.5 \times 10^{-6}$ mol $CF_2Cl_2$. The overall target efficiency of the laser used is about 2% in such a way that 1 Kwh or $3.6 \times 10^6$ Joule primary electric energy allows theoretically to decompose selectively from an isotopic point-of-view, $(3.6 \times 10^6)/50 \times 0.5 \times 10^{-6} = 3.6 \times 10^{-2}$ mol $CF_2Cl_2$, that is 4.32 mg $CF_2Cl_2$.

According to the invention, a mixture from $CF_2Cl_2$ and $O_2$ is irradiated with photons by means of a pulsed and focalized laser beam at an optical frequency corresponding to a wave number lying in the band from 920 to 945 cm$^{-1}$ to enrich the residual $CF_2Cl_2$ with $^{37}Cl$, in the band from 1050 to 1075 cm$^{-1}$ to produce $COF_2$ enriched with $^{13}C$ and/or in the band from 1080 to 1095 cm$^{-1}$ to enrich $CF_2Cl_2$ with $^{35}Cl$ and $^{13}C$.

The method is based on a series of experimental tests which were performed on mixtures of $CF_2Cl_2$ and $O_2$ which were irradiated by means of laser lines at frequencies in three different areas between the fundamental frequencies with wave number $\gamma_6$ (922 cm$^{-1}$) and $\gamma_1$ (1099 cm$^{-1}$) with pulses of about 1 Joule energy and a duration of 80 FWHM and 200 ns FW ("FWHM=Full width at half maximum" and "FW=Full width" which thus means the complete width of half the amplitude height and the complete width on the horizontal amplitude axis, respectively).

The laser used therefor was a $CO_2$ laser (Lumonics Mod. 203) the gas supply to which did not contain any $N_2$.

Similar tests were also performed by means of a $CO_2$ laser the gas supply to which had the following relative concentrations: $CO_2 = 1$; $N_2$ comprised between 0.20 and 0.45; He comprised between 4.0 and 4.5.

Typical values, but however not necessarily optimum ones, depending on the structure of the $CO_2$ laser used are as follows: $CO_2/N_2/He = 1.0.22/4.44$.

The absolute value of the total flow rate of said gas supply is generally comprised between 1 liter to a few liters per minute, whereby the accurate value is not critical and is mainly a function of the repetition rate of the $CO_2$ laser of TEA type and the manufacturing details thereof.

When $N_2$ is present in the gas supply of the $CO_2$ laser, the amplitude of a pulse of 1 Joule is lowered by 50% relative to a pulse of 1 Joule obtained with a $CO_2$ laser the gas supply to which does not contain any $N_2$, while the duration of such a pulse is magnified by a factor of about 20.

Use is made thereby of an irradiating cell from stainless steel with NaCl windows with a diameter of 3 cm and a total gas volume of 180 cm$^3$. The cell was connected through a needle-valve to a four-pole mass spectrometer. The Freon used was bottled gas purified by distillating, whereby the irradiations were performed at room temperature.

For each one of said tests the enrichment factor $\beta$ in the residual $CF_2Cl_2$, both for the carbon and chlorine isotopes, was computed, that is the ratio $R/R_o$ in which $R_o$ is the ratio of the natural concentration $^{13}C/^{12}C$, $^{12}C/^{13}C$, $^{35}Cl/^{37}Cl$ or $^{37}Cl/^{35}Cl$ and R is the same ratio after irradiating.

Figure 2:
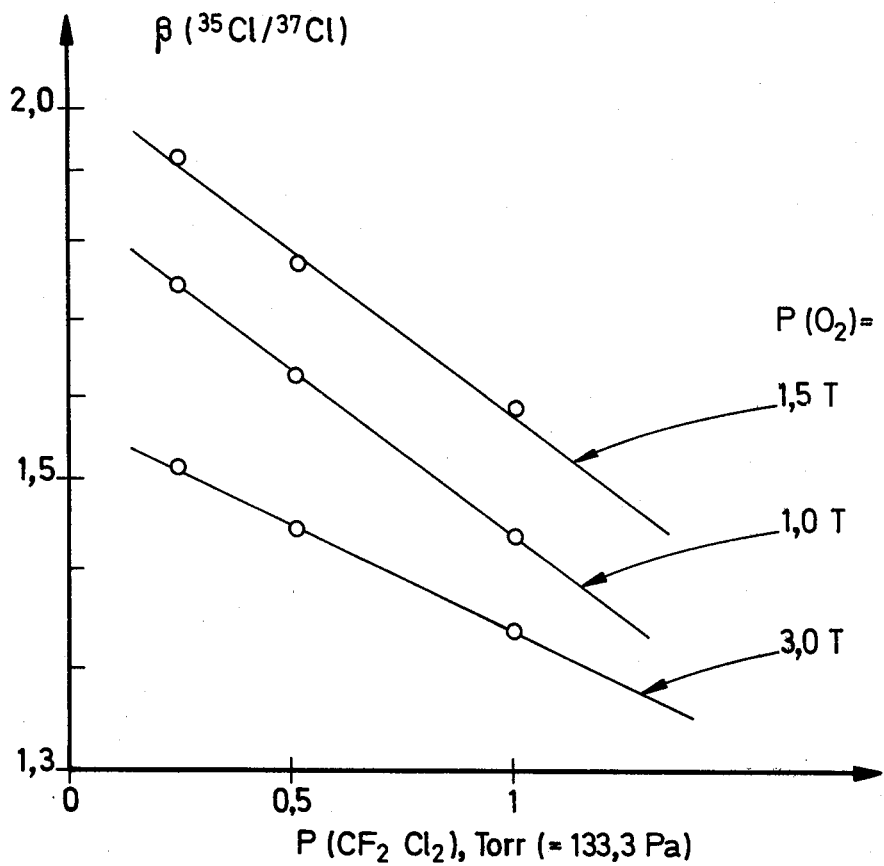
FIG. 2 is a diagram showing the enrichment factor $\beta(^{35}Cl/^{37}Cl)$, obtained with an irradiating with a wave number of about 1085 cm$^{-1}$ as a function of the partial pressure of the mixture components $CF_2Cl_2$ and $O_2$.
Figure 3:
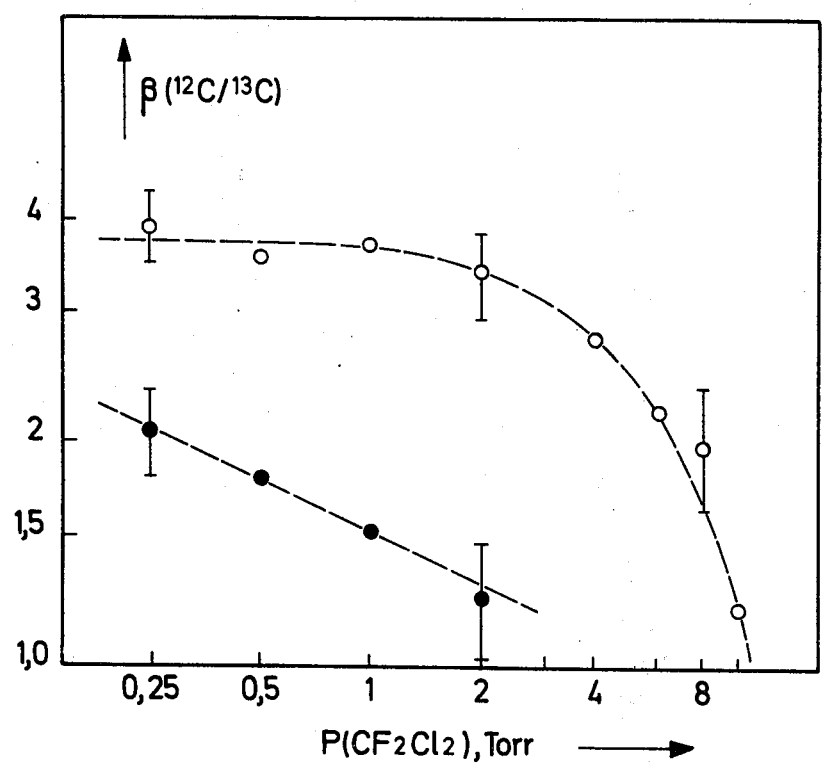
FIG. 3 is a diagram showing the enrichment factor $\beta(^{12}C/^{13}C)$, obtained by an irradiating with a wave number of about 1056 cm$^{-1}$, as a function of the partial pressure of $CF_2Cl_2$ in the gas mixture $CF_2Cl_2 + O_2$.
Figure 4:
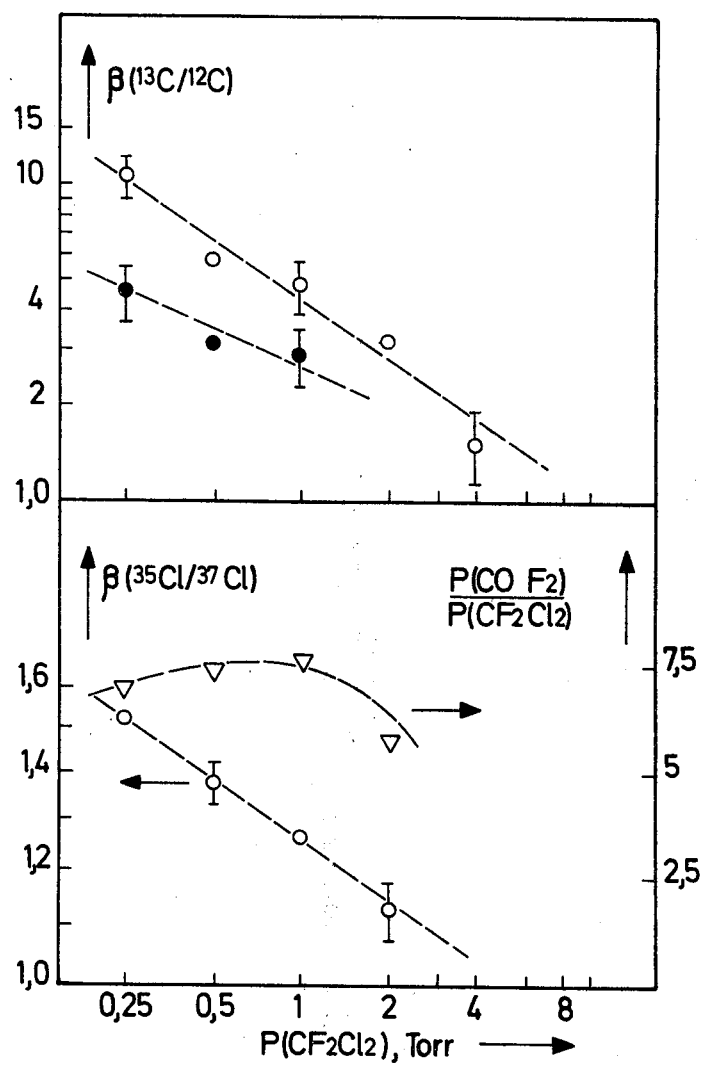
FIG. 4 is a diagram showing on the one hand, the enrichment factor $\beta(C^{13}C/^{12}C)$ and on the other hand, the enrichment factor $\beta(^{35}C/^{37}C)$ and the relative amount of formed $COF_2$, as a function of the partial pressure of $CF_2Cl_2$ in the irradiated gas mixture, whereby an irradiating at a wave number of about 1089 cm$^{-1}$ has been used.

All of the results were normalized to an incident pulse energy of 1 Joule, a total gas volume of 180 cm$^3$ and either 1250 laser pulses (in the case of FIGS. 1 and 2) or 1500 laser pulses (in the case of FIGS. 3 and 4).

Results regarding the effect of the change in the laser wave number on the enrichment factor $\beta$ are given in the diagram shown in FIG. 1, whereby the solid dots pertain to carbon isotopes and the open dots pertain to chlorine isotopes.

Thus for instance "$\beta(^{13}C/^{12}C)$" gives the ratio $R/R_o$ wherein $R_o = ^{13}C/^{12}C$ before the irradiating of the gas mixture and $R = ^{13}C/^{12}C$ after the irradiating of the same mixture.

From the diagram in FIG. 1 may be noted that for each one of the three above-defined irradiating ranges 920–945 cm$^{-1}$; 1050–1075 cm$^{-1}$; 1080–1095 cm$^{-1}$ the optimum lies approximately in the center or next to the center of said ranges.

It is further possible to deduce from the diagram in FIG. 1, according to the invention, that by adapting the laser and more particularly a $CO_2$ laser in such a way that it generates a radiation within the band from 1055 to 1075 cm$^{-1}$ the isotope variety $^{13}CF_2Cl_2$ is preferably decomposed. Consequently when oxygen is added to the Freon in the irradiating cell, there is obtained $COF_2$ enriched with $^{13}C$ according to the following relation

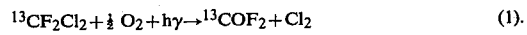

$$^{13}CF_2Cl_2 + \tfrac{1}{2} O_2 + h\gamma \rightarrow ^{13}COF_2 + Cl_2 \qquad (1).$$

The IR absorption by $^{12}CF_2Cl_2$ is very low in this wave number band, but it is however not unexistant. There is thus also a reaction according to the following relation:

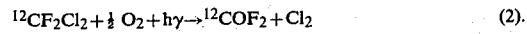

$$^{12}CF_2Cl_2 + \tfrac{1}{2} O_2 + h\gamma \rightarrow ^{12}COF_2 + Cl_2 \qquad (2).$$

The probability per molecule of the reaction according to relation (2) is at least 10 times lower than the one of the reaction according to relation (1).

As however in the unirradiated Freon the proportion of $^{12}CF_2Cl_2$ is about 100 times larger than the proportion of $^{13}CF_2Cl_2$, the compound $^{13}COF_2$ obtained according to relation (1) is not pure and this compound is polluted by the reaction products according to relation (2).

The reaction according to relation (2) is enhanced by a laser irradiating in the band 1080–1095 cm$^{-1}$. In such a case after separating the formed $COF_2$, there is thus an enrichment of the unreacted or residual $CF_2Cl_2$ with $^{13}C$.

According to a particular embodiment of the invention, there is obtained $COF_2$ enriched to 90 to 100% with $^{13}C$ by means of two succeeding laser irradiatings whereby the operations are conducted as follows:

A gas mixture from $CF_2Cl_2$ and $O_2$ is irradiated with a laser in the band 1050–1075 cm$^{-1}$ and the irradiating is stopped according to the invention at the moment where the formed $COF_2$ has an enrichment with $^{13}C$ lying between 5 and 20% and preferably about 10%.

The COF$_2$ thus enriched is separated and converted back according to a chemical operation known per se, into CF$_2$Cl$_2$ to be subjected to a second similar irradiating. The reaction according to relation (1) sets in again which produces a new enrichment of the formed COF$_2$ and this up to 100% with $^{13}$C.

One example of a chemical way to separate the COF$_2$ and to convert same back into CF$_2$Cl$_2$ is a follows:

(1) The mixture COF$_2$+CF$_2$Cl$_2$ is subjected to hydrolysis whereby the following reaction occurs:

COF$_2$+H$_2$O→CO$_2$+2HF, while the CF$_2$Cl$_2$ remains stable.

(2) The formed CO$_2$ and the CF$_2$Cl$_2$ are separated from one another by distillating at about −70° C.
(3) CO$_2$ is reduced to CO.
(4) By hydrogenating the CO, methane is formed according to the reaction: CO+3H$_2$→CH$_4$+H$_2$O at a temperature between 240° and 300° C. in the presence of a nickel catalyst.
(5) The methane is chlorinated according to the reaction: CH$_4$+4Cl$_2$→CCl$_4$+4HCl.
(6) By partly fluorinating the formed CCl$_4$, CF$_2$Cl$_2$ is obtained again according to the reaction:

CCl$_4$+F$_2$→CF$_2$Cl$_2$+Cl$_2$.

The COF$_2$ formed by the above-described second irradiating is separated according to the method as described above under (1) and (2).

It is also possible according to the invention, to further increase the concentrating of $^{13}$C by additional succeeding irradiatings which are always followed by a converting of the formed COF$_2$ into CF$_2$Cl$_2$.

According to another embodiment of the invention, the COF$_2$ enriched with $^{13}$C is obtained by first subjecting a mixture of CF$_2$Cl$_2$ and O$_2$ to an irradiating by means of a laser in the band 1080-1095 cm$^{-1}$ but preferably in the band 1085-1090 cm$^{-1}$. This thus results in the reaction according to relation (2) setting in for the major part or in other words the forming of $^{12}$COF$_2$. The laser irradiating is stopped according to the invention, when the residual CF$_2$Cl$_2$ is enriched for about 10% with $^{13}$C, whereafter the COF$_2$ is separated.

This residual CF$_2$Cl$_2$ thus enriched is thereafter subjected to a new irradiating by means of a laser, this time in the band 1050-1075 cm$^{-1}$ according to the first step in the preceding embodiment. The reaction according to relation (1) is thus performed in a selective way and COF$_2$ enriched to about 90% with $^{13}$C is formed.

In combination with said last embodiment it should be noted that besides an enrichment with $^{13}$C, there is simultaneously obtained an enrichment with $^{35}$Cl.

It may thus be deduced from the above and mostly from FIG. 1, that the industrial separating of $^{13}$C isotopes can be performed by means of an IR irradiating of a mixture of CF$_2$Cl$_2$ and O$_2$ by means of a pulsed and focalized laser beam within the range 1050-1075 cm$^{-1}$ in such a way that a marked enrichment with $^{13}$C is obtained for the COF$_2$ formed according to relation (1).

This is also possible by making an irradiating of a similar mixture within the range 1080-1095 cm$^{-1}$.

The industrial separating of chlorine isotopes in a mixture CF$_2$Cl$_2$—O$_2$ may be made by performing the irradiating by means of a laser in the range 920-945 cm$^{-1}$ to obtain CF$_2$Cl$_2$ enriched with $^{37}$Cl, and in the range from 1080 to 1095 cm$^{-1}$ to obtain CF$_2$Cl$_2$ enriched with Cl.

It should further be mentioned that in FIG. 1, between 1060 cm$^{-1}$ and 1069 cm$^{-1}$ the $\beta(^{12}C/^{13}C)$ curve is shown as an interrupted line. This is due to the irradiating energy of the CO$_2$ laser strongly decreasing in this range and even becoming unexistant about 1065 cm$^{-1}$.

However the results obtained at 1055 cm$^{-1}$ and 1069 cm$^{-1}$ appear already very useful for a practical application, as it will stand out hereinafter when considering the influence of the partial pressure of O$_2$ in the gas mixture on the enrichment factors.

The relation between the partial pressure from each component of the gas mixture and the enrichment factor $\beta$ has also been determined experimentally and is given in diagrams in FIGS. 2 to 4.

From FIG. 2 which pertains to an irradiating at a wave number of about 1085 cm$^{-1}$, with a CO$_2$ laser the gas supply of which does not contain any N$_2$ and which has already been defined above, it appears that it is of importance to maintain the partial pressure of O$_2$ in the gas mixture between 1 and 2 Torr and that the best results are obtained with an O$_2$-partial pressure of approximately 1.5 Torr.

There also appears from this figure that the enrichment factor $\beta(^{35}Cl/^{37}Cl)$ decreases with a higher partial pressure of CF$_2$Cl$_2$ in the gas mixture in such a way that for this enrichment factor, the best results are obtained with a partial pressure of CF$_2$Cl$_2$ lying between approximately 0.25 and 1 Torr.

It should thereby moreover be noted that similar conclusions may be drawn as regards the enrichment factor $\beta(^{13}C/^{12}C)$.

In FIG. 3 which pertains to an irradiating at a wave number of about 1056 cm$^{-1}$, the solid dots show the curve defining the enrichment factor $\beta(^{12}C/^{13}C)$ as a function of the partial pressure of CF$_2$Cl$_2$ in the gas mixture as obtained by irradiating with a CO$_2$ laser the gas supply to which does comprise N$_2$, which thus corresponds to pulses of relatively long duration. There can be deduced therefrom that said enrichment factor also decreases with the increase in the partial pressure of CF$_2$Cl$_2$ so that for the same reasons as for the chlorine isotopes, the best selectivity and efficiency are obtained between 0.25 and 1 Torr and preferably at about 0.5 Torr.

However as shown also in FIG. 3, this is not the case by an irradiating with a CO$_2$ laser the gas supply to which does not comprise any N$_2$, in such a way that the pulses have a shorter duration. Indeed the open dots of the top curve in FIG. 3 define the course of the enrichment factor $\beta(^{12}C/^{13}C)$ by an irradiating with a CO$_2$ laser the gas supply to which does not contain any N$_2$. There may thus be deduced from said curve that the enrichment factor remains substantially constant in an unexpected way, with a partial pressure of CF$_2$Cl$_2$ between 0.25 and 4 Torr.

Moreover by comparing with the lower curve which relates to the irradiating of the same gas mixture by means of a CO$_2$ laser the gas supply to which contains N$_2$, it is noted that the enrichment factor is substantially doubled at a partial pressure of 0.25 Torr for CF$_2$Cl$_2$.

This difference becomes of course larger with an increase in this partial pressure.

It must further be stated that the curves in FIG. 3 habe been plotted at a partial pressure of 1.5 Torr for O$_2$.

FIG. 4 pertains to a diagrammatic showing of tests similar to the tests according to FIGS. 2 and 3, whereby however a wave number of about 1089 cm$^{-1}$ has been used.

As it may be deduced from FIG. 4a, the lowering of the enrichment factor $\beta(^{13}C/^{12}C)$ by an increase in the partial pressure of $CF_2Cl_2$ is similar for an irradiating by means of a $CO_2$ laser the gas supply to which does contain $N_2$ as shown by the solid dots, and for an irradiating by means of $CO_2$ laser the gas supply to which does not comprise any $N_2$ as shown by the open dots in FIG. 4a.

There is actually noted a lowering of the value by a factor of about 2 with pulses of equal energy but longer duration, which are thus obtained with a $CO_2$ laser with $N_2$ in the gas supply.

As shown in FIG. 4b, it is possible at 1089 cm$^{-1}$ to measure simultaneously the relative amount of the formed $COF_2$ besides the enrichment factors $\beta(^{13}C/^{12}C)$ and $\beta(^{35}Cl/^{37}Cl)$.

The lowering as a function of the partial pressure increase for $CF_2Cl_2$, of the enrichment factor $\beta(^{35}Cl/^{37}Cl)$ is equivalent to the lowering of the enrichment factor $\beta(^{13}C/^{12}C)$, while the relative reaction degree is proportional to the relative amount of formed $COF_2$.

There may be deduced mostly from FIG. 3 that according to the invention, when the irradiating occurs in the band 1050–1075 cm$^{-1}$, it is useful to maintain the partial pressure of $CF_2Cl_2$ in the gas mixture between 2 and 4 Torr and to make use of $CO_2$ laser the gas supply to which does not contain any $N_2$. In this way the efficiency of the enrichment with $^{13}C$ is increased by a substantial factor relative to an irradiating in the other above-defined bands.

It should however be further noted that in the range 1050–1075 cm$^{-1}$ the absorption coefficient of $CF_2Cl_2$ is very low (about 1% of the value thereof at 1100 cm$^{-1}$, that is about $7.5 \times 10^5$ cm$^{-1}$ Torr$^{-1}$.

Figure 5:
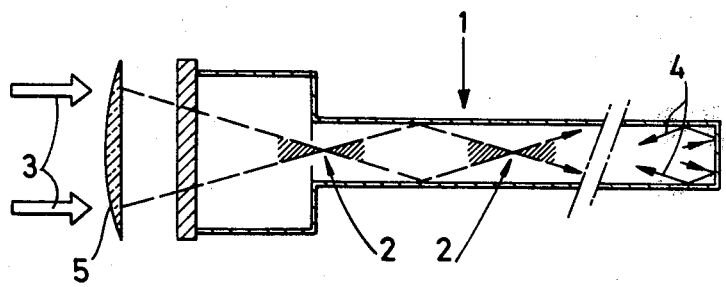
FIG. 5 is a diagrammatic showing of a lengthwise cross-section through a component of the equipment which can be used to work the method according to the invention.

It may thus be of importance to use a maximul amount of laser photons, to provide an "optic trap" as shown in FIG. 5.

It is reckoned when using such a device, that the use coefficient for the photons may be brought between 10 and 20%.

This device comprises essentially a tube with IR rays-reflecting walls 1 in such a way that in the reaction volumes 2, the rays generated by a laser not shown, follow the path shown by arrows 4 after being first focalized by means of a lens 5.

Most applications of the stable carbon or chlorine isotopes separated according to the invention lie in the use as tracers in all kinds of areas.

The carbon enriched with $^{13}C$ is of particular importance for the preparation of marked molecules mostly for biological and medical applications.

Chlorine enriched with $^{35}Cl$ or $^{37}Cl$ is mostly of importance for kinetic studies of reactions with chlorine compounds, for studies of the distribution of polluting either from industries making use of chlorinated products, or from the combustion of chlorinated wastes, such as polyvinyl chloride.

It must be understood that the invention is in no way limited to the above embodiments and that many changes may be brought therein without departing from the scope of the invention as defined in the appended claims.

We claim:

1. Method for enriching a gas-like isotopic mixture with at least one isotope, which comprises irradiating a mixture of $CF_2Cl_2$ and $O_2$ by means of a pulsed and focalised laser beam at an optical frequency corresponding to a wave number lying in one of the following bands: 920–945 cm$^{-1}$ and/or 1080–1095 cm$^{-1}$, so as to form $COF_2$ and $Cl_2$ as reaction products, separating the residual $CF_2Cl_2$ from these reaction products, so as to obtain, for an irradiation in the band 920–945 cm$^{-1}$, residual $CF_2Cl_2$ enriched with $^{37}Cl$ and, for an irradiation in the band 1080–1095 cm$^{-1}$, residual $CF_2Cl_2$ enriched with $^{35}Cl$ and $^{13}C$.

2. Method as defined in claim 1, in which in a mixture of $CF_2Cl_2$ and oxygen which is irradiated, a partial pressure of $CF_2Cl_2$ between 0.25 and 5 Torr and a partial pressure of oxygen between 1 and 2 Torr is retained (1 Torr = 133.3 Pascal).

3. Method as defined in claim 2, in which a partial pressure of oxygen in the range of 1.5 Torr is retained in said mixture.

4. Method as defined in claim 1, in which use is made of a $CO_2$ laser.

5. Method as defined in claim 1, in which a mixture of $CF_2Cl_2$ and $O_2$ is irradiated by means of a pulsed and focalized laser beam at an optical frequency corresponding to a wave number which lies approximately in the center or adjacent the center of the band 920–945 cm$^{-1}$ to enrich the residual $CF_2Cl_2$ with $^{37}Cl$ and/or approximately in the center or adjacent the center of the band 1080–1095 cm$^{-1}$ to enrich the residual $CF_2Cl_2$ with $^{35}Cl$ and $^{13}C$.

* * * * *

UNITED STATES PATENT AND TRADEMARK OFFICE
CERTIFICATE OF CORRECTION

PATENT NO. :  4,313,807
DATED      :  February 2, 1982
INVENTOR(S) : de Mèvergnies It is certified that error appears in the above—identified patent and that said Letters Patent is hereby corrected as shown below:

Title page, item (75):

The name of the first inventor should read:

-- Marcel Nève de Mèvergnies --

Signed and Sealed this

Sixth Day of July, 1993

Attest:

MICHAEL K. KIRK

Attesting Officer

Acting Commissioner of Patents and Trademarks